(12) United States Patent
Sui et al.

(10) Patent No.: US 11,095,753 B2
(45) Date of Patent: Aug. 17, 2021

(54) DYNAMIC INITIATION OF SERVICES

(71) Applicant: INTERNATIONAL BUSINESS MACHINES CORPORATION, Armonk, NY (US)

(72) Inventors: Guang Han Sui, Beijing (CN); Guang Ya Liu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 16/565,867

(22) Filed: Sep. 10, 2019

(65) Prior Publication Data

US 2021/0075884 A1 Mar. 11, 2021

(51) Int. Cl.
*H04L 29/08* (2006.01)
*H04L 29/06* (2006.01)

(52) U.S. Cl.
CPC ............ *H04L 67/325* (2013.01); *H04L 67/16* (2013.01); *H04L 67/20* (2013.01); *H04L 67/30* (2013.01); *H04L 67/34* (2013.01); *H04L 67/36* (2013.01); *H04L 67/40* (2013.01)

(58) Field of Classification Search
CPC ....... H04L 67/325; H04L 67/16; H04L 67/20; H04L 67/30; H04L 67/34; H04L 67/36; H04L 67/40; H04L 67/327; H04L 41/0823; G06F 9/5038; G06F 9/505
See application file for complete search history.

(56) References Cited

U.S. PATENT DOCUMENTS

| | | | |
|---|---|---|---|
| 8,250,213 B2 | 8/2012 | Glover | |
| 8,543,800 B2 | 9/2013 | Arditti | |
| 10,261,836 B2 | 4/2019 | Bansal | |
| 10,432,537 B2* | 10/2019 | Zhang | ................ H04L 41/0896 |
| 10,498,857 B2* | 12/2019 | Thompson | .......... H04L 41/0823 |
| 2014/0195660 A1 | 7/2014 | Behrendt | |

(Continued)

FOREIGN PATENT DOCUMENTS

| | | |
|---|---|---|
| CN | 105959390 A | 9/2016 |
| CN | 109522115 A | 3/2019 |

OTHER PUBLICATIONS

Disclosed Anonymously, "A Smart Method to Distribute Server for Service Management", ip.com, May 8, 2018, 6 pages, ip.com No. IPCOM000253816D, Retrieved from the Internet: < https://priorart.ip.com/IPCOM/000253816>.

(Continued)

*Primary Examiner* — Todd L Barker

(74) *Attorney, Agent, or Firm* — Steven M. Bouknight

(57) ABSTRACT

Embodiments of the present disclosure relate to dynamic initiation of services. In an embodiment, a computer-implemented method is disclosed. According to the method, it is detected whether a first service of a plurality of services is requested in a computing environment. The plurality of services support execution of different types of tasks of a function. In response to detecting that the first service is requested, a second service in the plurality of services that depends on the first service is determined based on a dependency relationship between the plurality of services. At least one instance of the second service is initiated in the computing environment before the second service is requested. In other embodiments, a system and a computer program product are disclosed.

16 Claims, 11 Drawing Sheets

(56) References Cited

U.S. PATENT DOCUMENTS

| | | | |
|---|---|---|---|
| 2016/0277525 A1* | 9/2016 | Porat | G06F 8/36 |
| 2017/0090961 A1* | 3/2017 | Wagner | G06F 9/5077 |
| 2018/0048716 A1* | 2/2018 | Madhayyan | H04L 61/2015 |
| 2018/0077031 A1* | 3/2018 | Chen | H04L 41/5025 |
| 2018/0254996 A1 | 9/2018 | Kairali | |
| 2019/0132211 A1* | 5/2019 | Yeung | H04L 41/0896 |
| 2019/0190795 A1* | 6/2019 | Kim | H04L 43/0805 |
| 2020/0280592 A1* | 9/2020 | Ithal | H04L 9/0891 |

OTHER PUBLICATIONS

Mohamed, et al., "Web Service Micro-Container for Service-based Applications in Cloud Environments," 2011 IEEE 20th International Workshops on Enabling Technologies: Infrastructure for Collaborative Enterprises, 2011, pp. 61-66, Paris, FR, Retrieved from the Internet: <https://ieeexplore.ieee.org/document/5990002/>.

Toffetti, et al., "An architecture for self-managing microservices", AIMC15, Apr. 21, 2015, 6 pages, Zurich University of Applied Sciences, Zurich, CH, Retrieved from the Internet: <https://pd.zhaw.ch/publikation/upload/211458.pdf >.

Mell et al., "The NIST Definition of Cloud Computing", National Institute of Standards and Technology, Special Publication 800-145, Sep. 2011, 7 pages.

\* cited by examiner

DYNAMIC INITIATION OF SERVICES

BACKGROUND

The present invention relates to computer techniques, and more specifically, to dynamic initiation of services.

A service/application (referred to hereinafter as a service) is a program or process that typically runs on one or more hosts in a computing environment to provide a corresponding task or function. A number of instances of the service (also referred to as service instances) may be initiated in the computing environment to process workloads of the task/function. In some cases, a large scale service may be divided into a number of smaller services in order to enhance cohesion in the computing environment. Such smaller services may sometimes be referred to as micro services. Each of the smaller services may be responsible for a different task of the function supported by the large service. Similarly, one or more instances for the smaller services may be initiated to provide execution of corresponding tasks. In a complex system, there will be thousands of services and then millions of instances may be initiated for the corresponding services.

SUMMARY

According to one embodiment of the present invention, there is provided a computer-implemented method. According to the method, it is detected whether a first service of a plurality of services is requested in a computing environment. The plurality of services support execution of different types of tasks of a function. In response to detecting that the first service is requested, a second service in the plurality of services that depends on the first service is determined based on a dependency relationship between the plurality of services. At least one instance of the second service is initiated in the computing environment before the second service is requested.

According to a further embodiment of the present invention, there is provided a system. The system comprises a processing unit; and a memory coupled to the processing unit and storing instructions thereon. The instructions, when executed by the processing unit, perform acts of the method according to the embodiment of the present invention. Specifically, according to the method, it is detected whether a first service of a plurality of services is requested in a computing environment. The plurality of services support execution of different types of tasks of a function. In response to detecting that the first service is requested, a second service in the plurality of services that depends on the first service is determined based on a dependency relationship between the plurality of services. At least one instance of the second service is initiated in the computing environment before the second service is requested.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention. The method may include detecting whether a first service of a plurality of services is requested in a computing environment. The plurality of services support execution of different types of tasks of a function. In response to detecting that the first service is requested, a second service in the plurality of services that depends on the first service is determined based on a dependency relationship between the plurality of services. At least one instance of the second service is initiated in the computing environment before the second service is requested.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
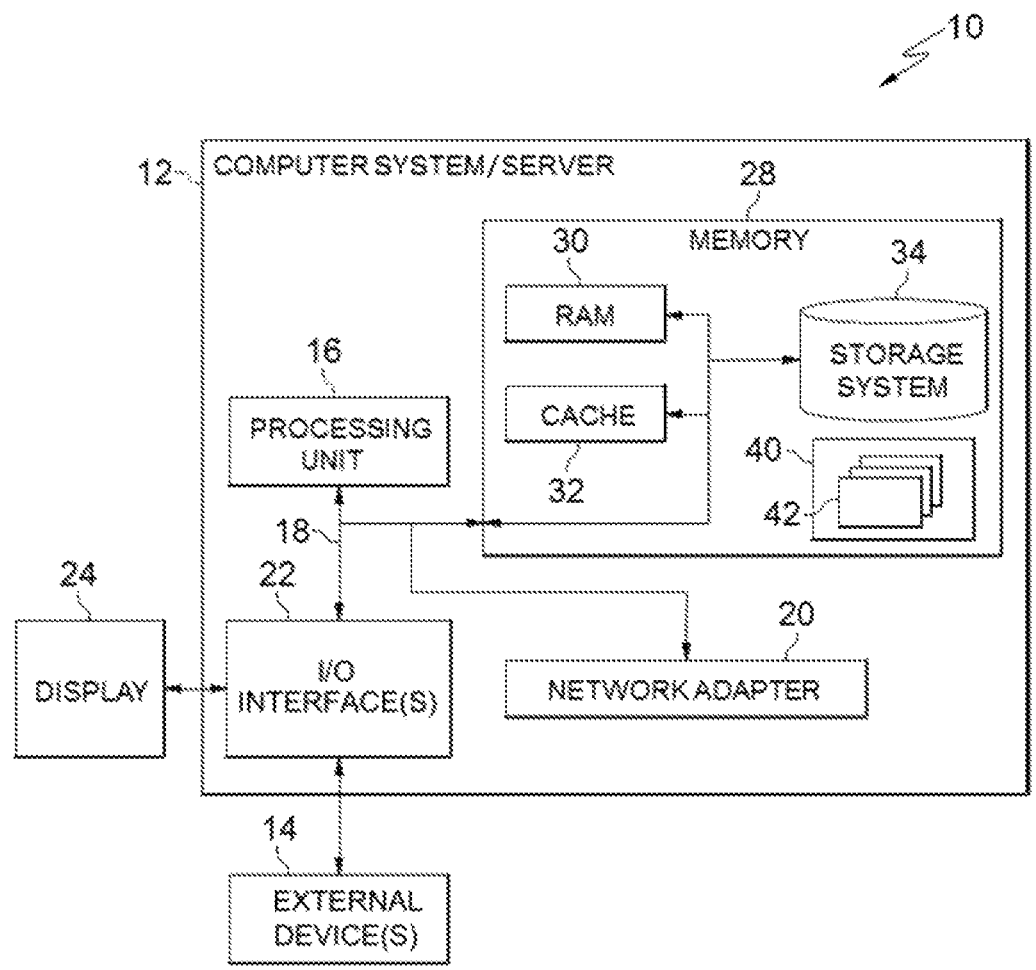
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
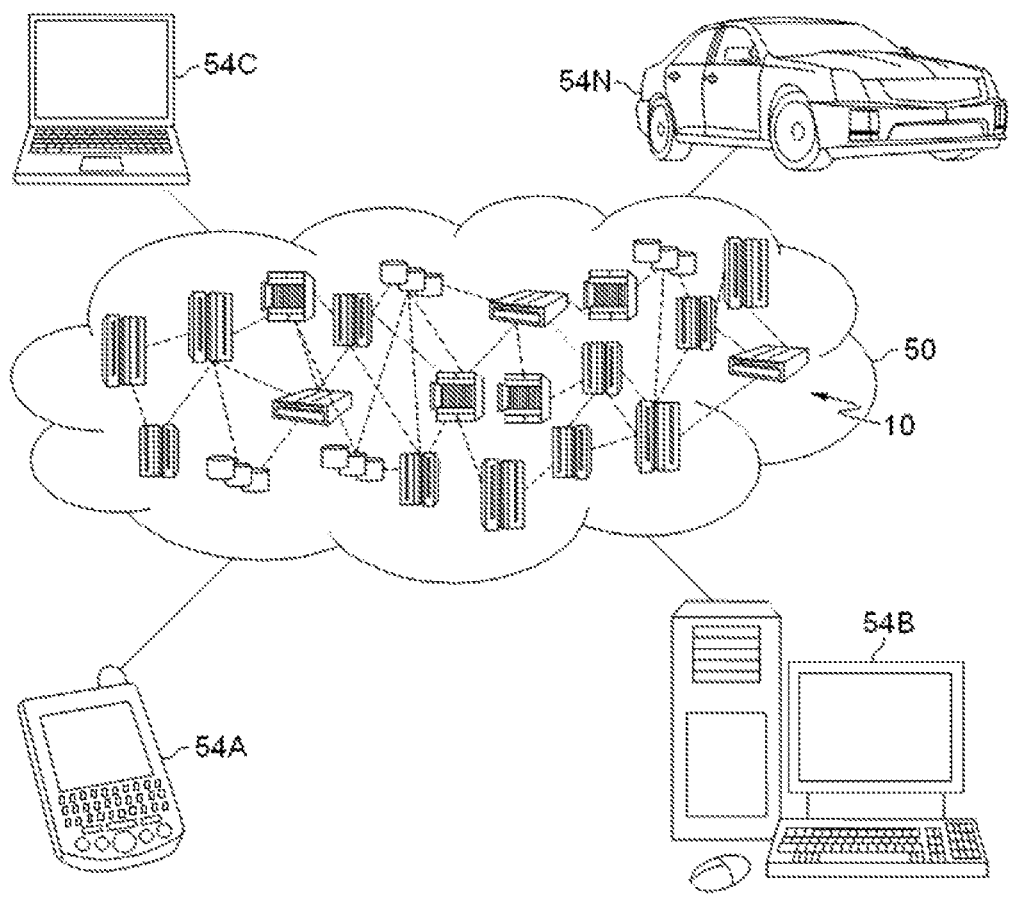
FIG. 2 depicts a cloud computing environment according to an embodiment of the present invention.

Referring now to FIG. 2, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. Nodes 10 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
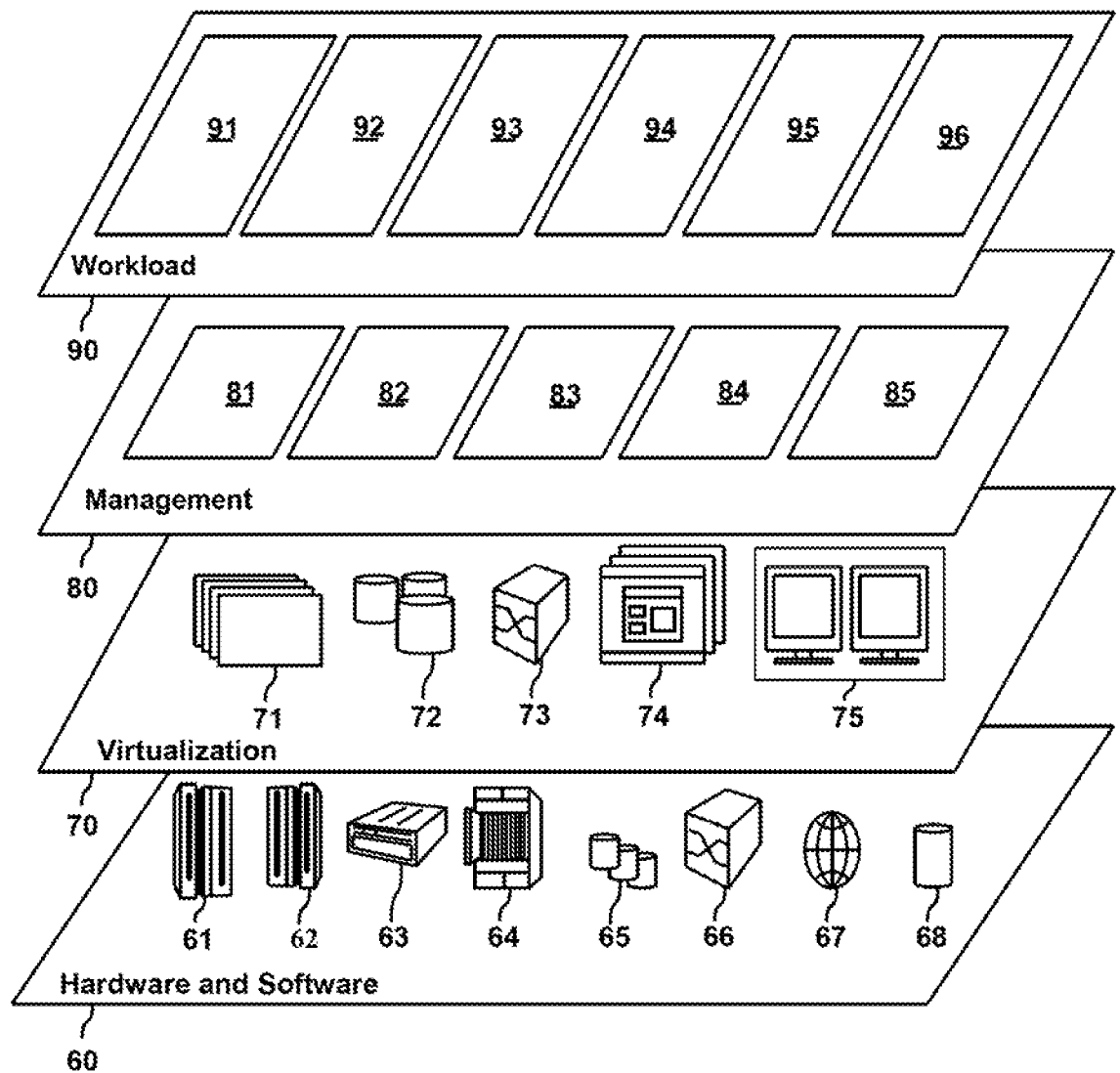
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service initiating 96. The functionalities of service initiating 96 will be described in the following embodiment of the present disclosure.

As used herein, a "service" can be a general term that can refer to any service capable of being executed in or otherwise provisioned by a computing environment to support a corresponding task or function. For example, a service can be any type of web service, identity management service, firewall or other security service, messaging service, data storage or backup service, file maintenance service, or any other service that can be made available to an end user of the computing environment. It should be appreciated that other services associated with or otherwise supported by a computing environment are envisioned.

A large-scale service may be broken up into a plurality of smaller services, which may also be referred to as micro services or service components. Those micro services may communicate with each other to support execution of the whole function of the large-scale service, whereby each micro service is responsible for a different aspect of the function or a different type of tasks to be executed of the function. Simply stated, micro services may be applications/ components communicating with one another so as to provide a large-scale service.

As used herein, an "instance" of a service or a service instance can refer to the service that is launched, initiated, hosted, executed, or provisioned in the computing environment. One or more instances of a same service can be provided to handle requests for the service that come by batch. Each instance of the service has the same service definition of the corresponding service and thus may be considered as the same service for the end user. As such, it is possible to achieve a high throughput capacity and serve more users.

Figure 4:
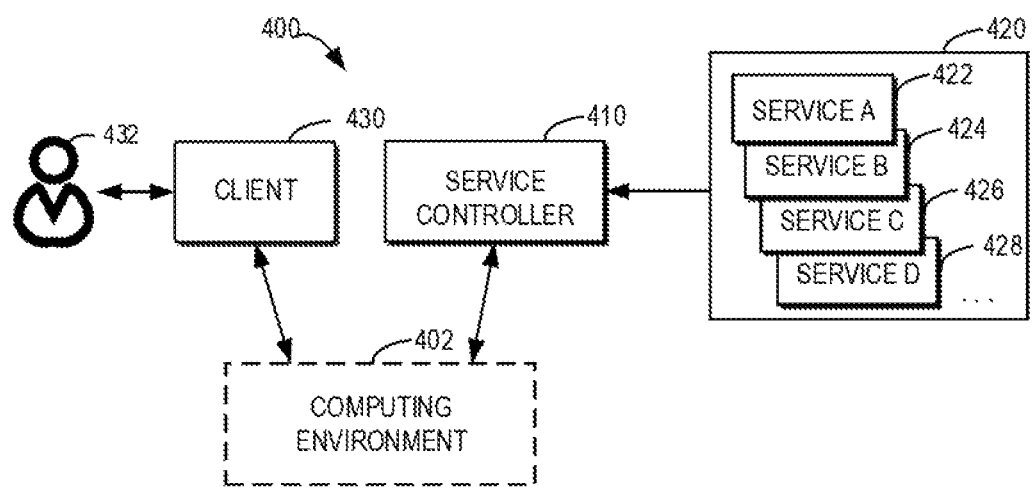
FIG. 4 depicts a block diagram of a system in which embodiments of the present invention can be implemented.

Referring now to FIG. 4, a block diagram of a system 400 in which embodiments of the present invention can be implemented is depicted. In the system 400, a service controller 410 is configured to control initiation of a collection 420 of services. The collection 420 of services includes a plurality of services, for example, service A 422, service B 424, service C 426, service D 428, and so on. The collection 420 of services can be initiated to provide a particular function which can be considered as a large-scale service. Thus, the respective services 422 to 428 may also be referred to as micro services. Those services 422, 424, 426, 428 may communicate with each other in order to achieve the completion of the particular function. Each of the services 422, 424, 426, 428 may support a different type of task of that function.

The service controller 410 can initiate the collection 420 of services in a computing environment 402, which provides any software and/or hardware resources for service deployment. The initiation of the collection 420 of services in the computing environment 402 may be triggered by an end user 432 via a client 430 which expects to request the corresponding function. The computing environment 402 may be implemented in a centralized manner by a single device, such as a computing device, a server, a mainframe, and/or the like. The computing environment 402 may also be any type of distributed computing environment implemented by a variety of computing nodes/devices. An example of the distributed computing environment may include a cloud computing environment, such as the cloud computing environment 50 of FIG. 2.

The specific service initiation may depend on configuration of the computing environment 402. In some examples, to initiate a service, the service controller 410 may launch one or more containers or processes for one or more instances of the service. The launched containers or processes are then running to provision the specific service. The more the instances are initiated for a service, the higher the task efficiency the service can achieve and of course, the larger the amount of processing resources are required from the computing environment 402.

It would be appreciated that the system 400 is merely provided as a specific example and embodiments of the present invention can be implemented in any other systems with different arrangements. The number of services in FIG. 4 is merely shown for purpose of illustration and in other examples, a different number of services may work together to provide a function of a larger service. The services may be requested by more end users via their clients.

Conventionally, if a plurality of services are required to support different tasks of a same function, for example, a plurality of micro services are required for a function of a larger service, a predetermined number of instances of all the services may be initiated before a request for the function is received. All of the instances of the services may keep running to ensure that the respective tasks of that function can be executed timely. However, the instances of some services may be running for no reason because the instances have to wait for the completion of the previous tasks executed by other services. Thus, computing resources including processing, storage, and/or network resources may be wasted by running such a number of instances in the computing environment.

Another possible solution is to start instances of a service as late as requests for the service are coming. Although this solution can save the resources to a certain extent, the processing of the task may be delayed because it takes time to initiate the instances. Accordingly, the latency of the function completion will increase and the user experience will thus be disrupted.

In accordance with embodiments of the present invention, there is provided a solution for dynamic initiation of services. In this solution, for a plurality of services that support different tasks of a same function, their instances are initiated dynamically in a computing environment based on a dependency relationship between the plurality of services. Instances of a service are not initiated until it is detected that another service on which that service depends is requested in the computing environment. In addition, the instance initiation of the service is before that service is requested. As such, not all but necessary services will have their instances initiated in a computing environment so as to save resources. In addition, it will not increase the latency of task execution and the function completion because the services can be timely initiated before the requests are coming.

The service initiation proposed herein can be implemented in the system 400, more particularly, by the service controller 410 in the system 400. For purpose of discussion, the embodiments of the present invention will be described in detail with reference to FIG. 4.

According to the embodiments of the present invention, the service controller 410 is configured to dynamically initiate instances of the collection 420 of services into the computing environment 402. As briefly mentioned above, the service initiation is based on a dependency relationship between those services. Thus, before initiating the instances of the services, the service controller 410 may obtain or determine a dependency relationship between the collection 420 of services. Those services are used to support execution different aspects or different types of tasks of a same function and thus will work closely to complete that function. Their dependency can be identified to facilitate the service initiation.

As used herein, a dependency relationship between services or a "service dependency" can be a general term that can refer to any type of dependency in, between, or among one or more services. For example, a service dependency can specify that an output from one service must be used as an input for another service. For further example, a service dependency can specify that one service may request another service to operate and provide necessary results for further processing. It should be appreciated that other service dependencies in, between, or among services are envisioned. Generally, a dependent service may not receive a new request to execute its task until its precedent service has been initiated and has been requested to execute a task.

Figure 5:
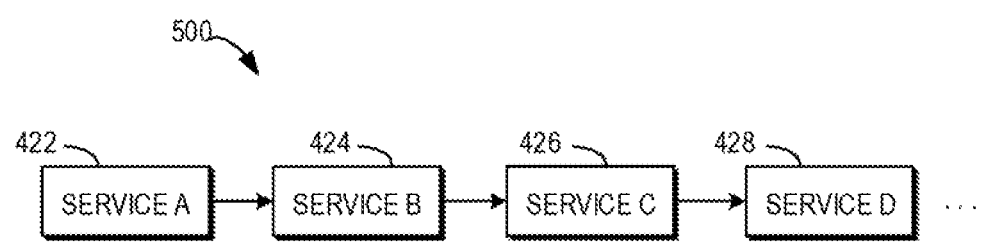
FIG. 5 depicts a schematic diagram showing an example dependency relationship between services according to an embodiment of the present invention.

FIG. 5 shows an example dependency 500 relationship between the collection 420 of services according to an embodiment of the present invention. In this shown example, an arrow from one service to another service indicates that the later service depends on the previous service. Accordingly, the dependency 500 indicates that service B 424 depends on service A 422, service C 426 depends on service B 424, service D 428 depends on service C 426, and the like. It would be appreciated that although the dependency 500 is shown to be a sequential dependency among the services, any other types of dependency may be possible according to the configuration of the collection of services. For example, one service may depend on more than one other service, and more than one service may depend on a same following service.

The determination of the dependency relationship will be discussed in detail below. Now it will be first described how the services can be initiated based on such dependency. For better illustrations, reference will be made to FIGS. 6A-6D which illustrate examples of the dependency-based service initiation at different stages.

The service controller 120 detects whether at least one service of the plurality of services (referred to as a "first service") is requested. At an initial stage, the service controller 120 detects whether at least one service that is expected to receive a request from a client is now requested. Such service may be the first one and depends on no other services among the plurality of services. For example, in the example of the system 400, the service controller 120 detects, at an initial stage, whether service A 422 is requested.

Figure 6A:
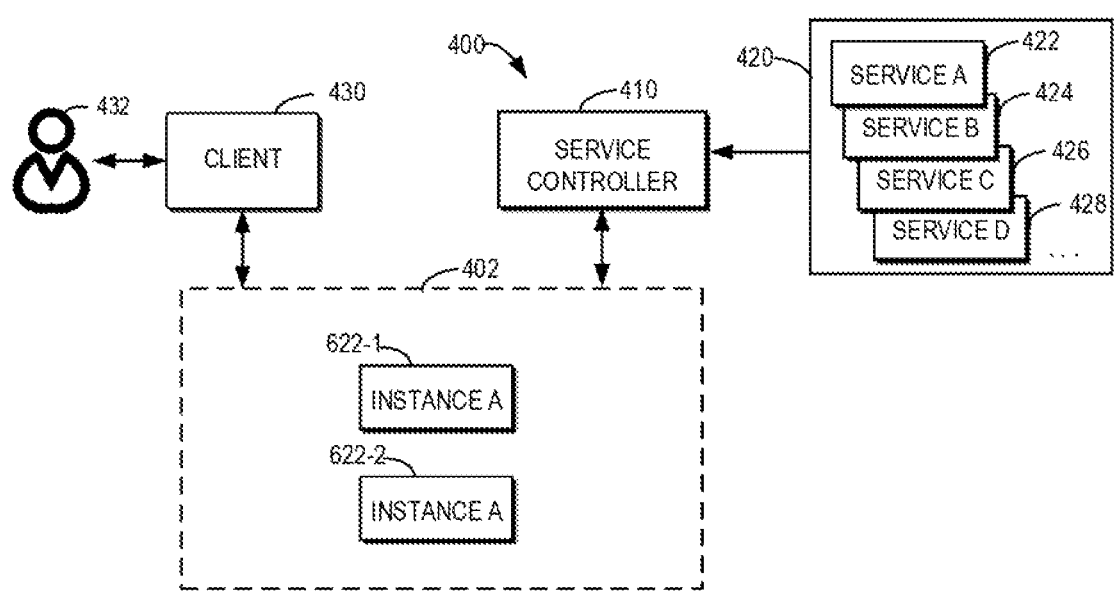
FIGS. 6A-6D schematically depict examples of service initiation at different stages according to embodiments of the present invention.

In some embodiments, for the first service that is detected to be requested, one or more instances of the first service may have been initiated in the computing environment 402 before this first service is requested. In the system 400, for example, service A 422 is the first one of the plurality of services that will receive requests from the end user 432 to execute a corresponding type of task. Accordingly, as shown in FIG. 6A, instances 622-1 and 622-2 for service A 422 are initiated in the computing environment 402. The two instances are denoted as instance A 622-1 and instance A 622-2 in FIG. 6A, respectively, which may be collectively or individually referred to as instances A 622. The initiation of service A 422 may be triggered by a request from the end user 432 or otherwise automatically triggered by the service controller 410 according to other service configuration.

Although two instances are initiated for service A 422 in the shown example, it would be appreciated that a different number of instances may be initiated. The number of instance(s) to be initiated for service A may be predetermined. In some embodiments, there may be more than one service that directly receive requests from end users and does not depend on other service. In this case, instances of those services may all be initiated in the computing environment 402.

The initiated instances are running in the computing environment 402 with resources therein. In some embodiments, when no requests are received for the initiated instances, the service controller 410 may create virtual tasks of the corresponding type for the initiated instance to execute.

With the instance(s) initiated, the service controller 410 may detect whether instance A 622-1 and/or instance A 622-1 of service A 422 are requested to execute the corresponding type of task. For purpose of discussion, such service (such as service A 422) may be referred to as a first service hereinafter. The service controller 410 may monitor the request for the first service in a periodic manner, upon reception of an event trigger, and/or in other suitable manner.

If the service controller 410 detects that the first service is requested, it may continue to start another service (referred to as a second service) based on the dependency relationship between the services. The service controller 410 determines, based on the dependency relationship between the services, the second service that depends on the first service. According to the dependency 500 shown in the example of FIG. 5, the service controller 410 may determine that service B 424 directly depends on service A 422.

Figure 6B:
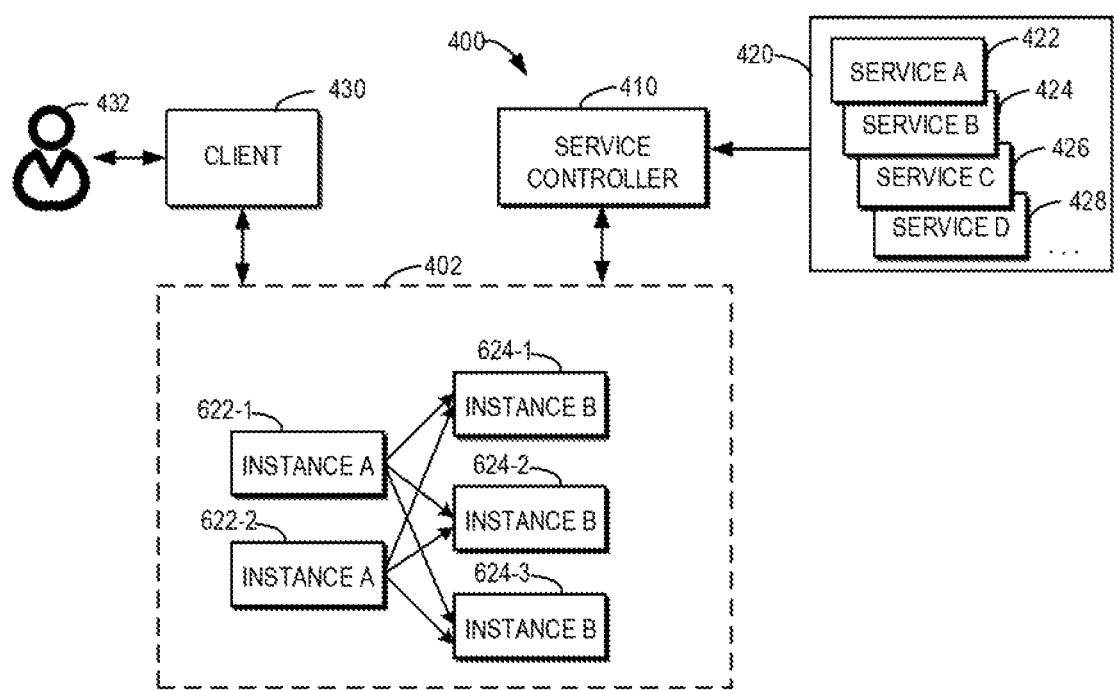

Then the service controller 410 initiates one or more instances of the second service in the computing environment 402. As shown in FIG. 6B, the service controller 410 initiates three instances 624-1 to 624-3 of service B 424 in the computing environment 402. The three instances are denoted as instance B 624-1, instance B 624-2, and instance B 624-3 in FIG. 6B, respectively, which may be collectively or individually referred to as instances B 624. The initiation of the instances of the second service is thus started before the second service is requested and after the first service is requested. As such, the instances of the second service will not be unnecessarily running in order to save resources and may be ready to execute the corresponding task supported by the second service when requested.

In some other embodiments, if the first service is detected to be requested and there is no instance of the first service initiated in the computing environment 402, the service controller 410 may start to initiate one or more instances of the first service first and then start to initiate the one or more instances of the second service. In an embodiment, the instance initiation of the first and second services may be performed in parallel.

In some embodiments, the service controller 410 may immediately initiate the instance(s) of the second service when the first service is detected to be requested. Alternatively, the service controller 410 may wait for a predetermined period of time after detecting a request for the first service and then start to initiate the instance(s) of the second service. In some embodiments, to control the initiating time of the second service more precisely and to further reduce latency for task execution, the service controller 410 may collect time information to determine a time point for initiating the one or more instances of the second service. The time information may include a time point when the first service is requested, an execution time duration of a task by the instance(s) of the first service, and an initiating time duration of the one or more instances of the second service.

In some embodiments, the time point for initiating the instance(s) of the second service may be determined such that the initiating is completed before execution of the task is completed by the one or more instances of the first service. In an embodiment, the initiating of the one or more instances of the second service is completed right before the task has been completed at the one or more instances of the first service. As such, there is a limited delay or almost no delay before a following task can be executed by the second initiated instances of the second service. The tasks of the function can be performed seamlessly. This is especially beneficial in the case where the first and second services depend from each other directly.

As an example, if two instances A 622 require five seconds to execute the corresponding task for an incoming request and it takes three seconds to complete the initiating process of three instances B 624, then the service controller 410 may start to initiate instances B 624 two seconds after instances A 622 receive the incoming request. As a result, once the task execution has been completed on instances A 622, all instances B 624 have been ready. Then, the following task may be executed by instances B 624 without any delay.

In some embodiments, the number of instances to be initiated for the second service (referred to as a "first number") may be determined by the service controller 410 based on the number of instances that have been initiated for the first service (referred to as a "second number") and a predetermined instance ratio of the first service to the second service. This instance ratio may be determined by analysis on historical execution of tasks by historical instances of the first and second services. For example, by collecting historical execution of tasks, it is found that outputs resulted from task execution by two instances of service A 422 need to be processed by three instances of service B 424 without introducing intolerable delay and workload congestion. The instance ratio may then be set as ⅔, which means that for every two instances of service A 422, three instances of services B will be started.

A proper instance ratio may be found through trial and error. The delay and workload congestion may be used as the criteria for determining whether a specific instance ratio is suitable or not. The instance ratio may be varied as input data for the tasks supported by the services change over time. Thus, this ratio may be updated dynamically by observing the task execution by the initiated instances.

Through the above process, instances of service A 422 and service B 424 are initiated and running in the computing environment 402. This process may be repeated by the service controller 410 to initiate further services (if any). In each round of the repetition, the service that has been initiated and detected as being requested may be the first service while a further service depends on the requested first service may be referred to as the second service.

Figure 6C:
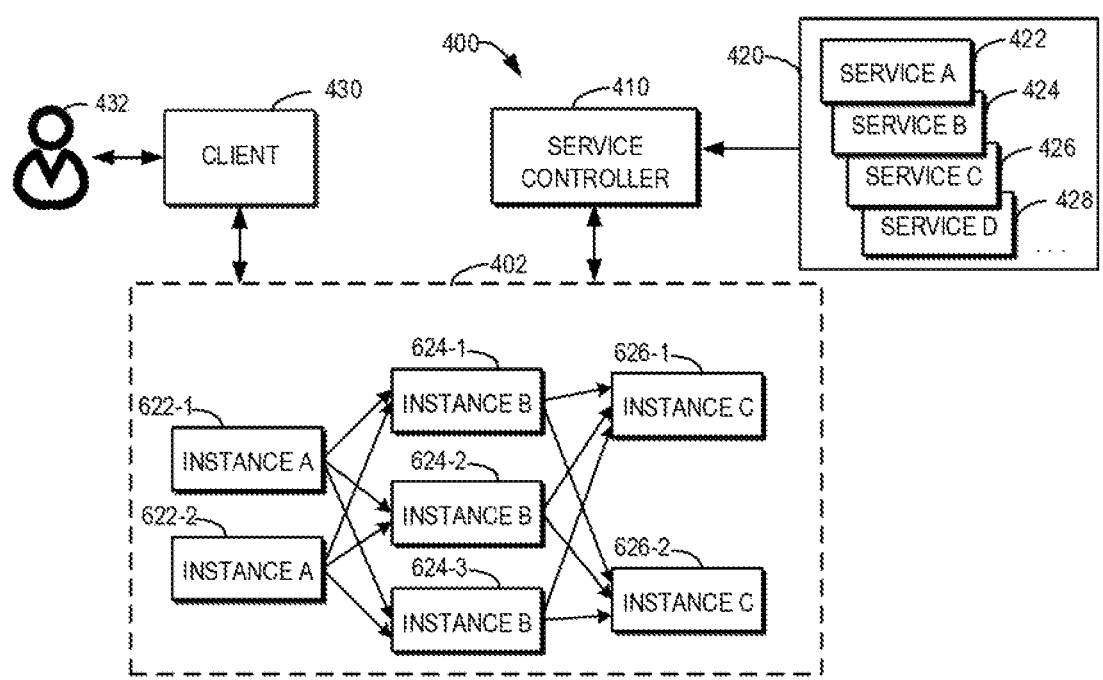
Figure 6D:
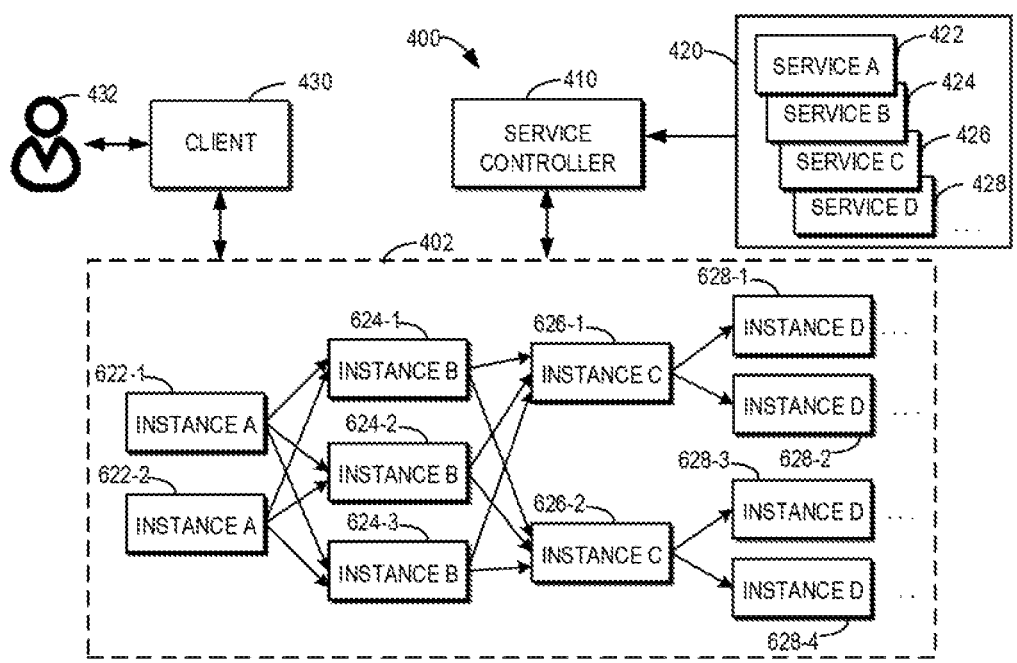

By way of example, in the system 400, the service controller 410 may detect that service B 424 is requested because one or more of instances B 624 is requested by one or more instances A 622 to execute the corresponding type of task. The service controller 410 then determines, based on the predetermined dependency 500, that service C 426 depends on service B 424. The service controller 410 thus initiates two instances C 626-1, 626-2 of service C 426 in the computing environment 402, as shown in FIG. 6C. The instances C 626-1 and 626-2 may be collectively or individually referred to as instances C 626. The start time point of the initiating and the number of instances C may be determined in a similar manner as those for service B 424. Similarly, instances of service D 428, such as four instances D 628-1 to 628-4, may also be initiated in a following time point, as shown in FIG. 6D.

In the above embodiments, when deciding to initiate a further service of the plurality of service, the service controller 410 initiates one or more instances for only the second service that directly depends on the first initiated service. In some other embodiments, the second service may be additionally determined as the one that depends indirectly on the first service via at least one further service of the plurality of services. That is to say, each time a first service is detected to be requested, one or more directly-dependent services and one or more indirectly-dependent services may be determined to be initiated. As an example, when service A 422 is detected to be requested, the service controller 410 may decide to initiate instances of both service B 424 and service C 426 at one time. Such embodiments may be suitable when the execution time duration of the task by instances B of service B 424 is too short such that there is no need to wait for the task execution begins in instances B.

In an embodiment, the indirect dependency may indicate that the second service depends on the first service via a predetermined number of other services instead of all the remaining services if the first service is the beginning service that directly receives requests from the end user. For example, the service controller 410 may initiate a service having a two-level indirect dependency or three-level indirect dependency on the first requested service. In this example, the predetermined number of other services is equal to one.

After instances of one or more services are initiated, the service controller 410 may monitor the state of task execution by the instances and dynamically terminate some or all of the idle instances so as to further reduce resource consumption in the computing environment 402. In some embodiments, if the service controller 410 detects that at least one of a number of instances initiated for a service is idle for task execution, it may terminate the at least one idle instance. In some embodiments, the service controller 410 may always keep one or more instances of the beginning service (the service that is directly requested by the end user 432) running in the computing environment 402 even if all the instances of that service are idle. Those running instances can provide prompt processing for the requests from the end user 432.

Figure 7:
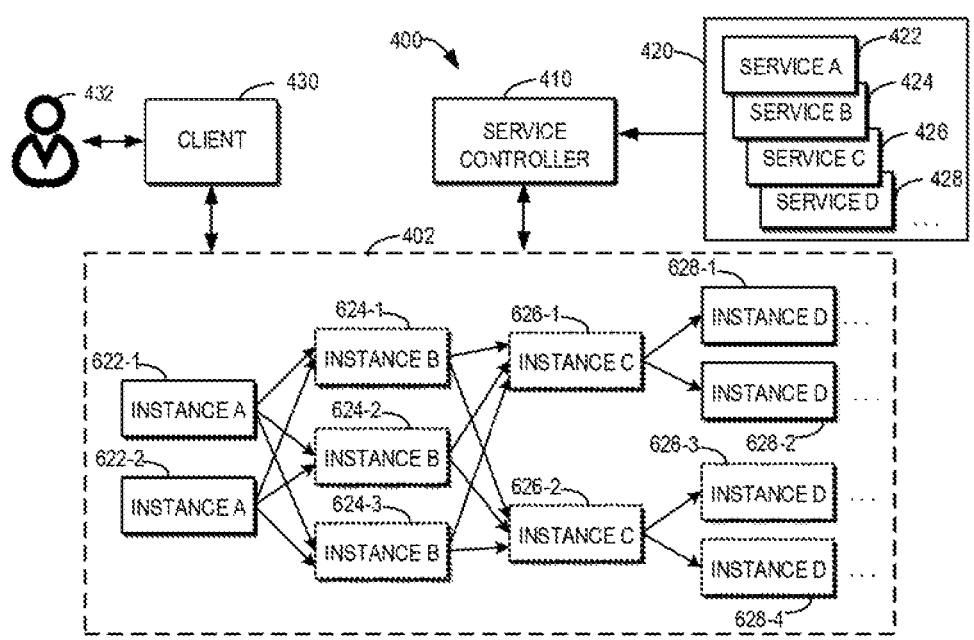
FIG. 7 schematically depicts an example of termination of initiated services according to an embodiment of the present invention.

FIG. 7 shows an example of termination of the initiated services according to an embodiment of the present invention. In FIG. 7, for purpose of illustration, the terminated instances are depicted as dashed boxes and the running instances are depicted as solid boxes. As shown, after all the instances from service A to service D are initiated, the service controller 410 monitors and detects that all instances B 624 of service B 424 and instance C 626 of service C 426 are idle. The service controller 410 terminates all the instances B 624 and instance C 626 (shown as dashed boxes).

The service controller 410 further detects that instances D 628-3, 628-4 of service D 428 are idle while instances D 628-1, 628-2 are running to execute the corresponding task as requested. Instances D 628-3, 628-4 may be first terminated (shown as dashed boxes) and instances D 628-1, 628-2 may also be terminated after the execution is completed. Instances A 622-1, 622-2 are always running and ready to execute the corresponding task upon requests from the end user. As such, only necessary instances of the services are kept running in the environment. The other instances may be later initiated if the service controller 410 detects further requests from the end user 432 or further requests input to trigger task execution by a service.

In the embodiments described above, the dependency relationship between the services is important for the service controller 410 to decide which service(s) to be initiated. The dependency relationship between the services may be determined in a variety of manners. In some embodiments, configuration profiles of the services may be used to determine the dependency. A configuration profile may be a file that defines service behavior. Upon analysis of the configuration profiles, it is possible to determine whether there is a relationship among two or more services and how these services depend from each other. As a specific example, it is defined in a configuration profile of a service that messages can be sent to one or more particular connection ports and it is also defined in a configuration profile of a further service that it should listen to one or more of the particular connection ports for coming messages. It can be determined from the two configuration profiles that the further service depends on the service. Other information contained in the configuration profiles may also be used to determine the dependency relationship between the services.

Alternatively, or in addition, the dependency relationship between the services may be determined through analysis on historical operational information associated with instances of the services that are historically initiated, which instances may also be referred to as historical instances hereinafter. The historical operational information may be collected during operation of the historical instances of the services. The historical instances are those that were previously running in the same computing environment 402 and/or other computing environment.

The historical operational information may be any information that is related to the dependency relationship between two or more services. In some embodiments, the historical operational information may include historical network connections among the historical instances of the services. The historical instances of different services may be initiated on separate hosts. The historical network connections were established and used by the historical instances for different services to convey data/request therebetween. If there is one or more direct network connection between historical instances of two services, it can be detected that the two services depend on one another. By further determining a source and destination of messages conveyed over the network connection, it can be further determined the specific dependency relationship between the two services.

The historical operational information may additionally or alternatively include historical data flows through the historical instances of the services. Generally, if a service depends on a further service, one or more instances of the further service may send output data or requests to one or more instances of the service for further processing or to trigger other operations. Thus, a data flow and its flow direction from instances of one service to instances of another service may indicate their direct dependency.

In some embodiments, a part or all of the dependency relationship between the services may be defined based on user input. For example, a user definition on the dependency relationship between some or all of the services may be received from a user to facilitate clarifying of the dependency. The user definition may be provided by a developer of the services, the service provider, and/or any other user that is aware of the partial or whole dependency. This user definition is especially beneficial when the services are first initiated in the environment and there is no historical information for use.

In some embodiments, the dependency relationship between the services may be determined at the side of the service controller 410. In some other embodiments, the dependency may be determined by a separate device or module from the service controller 410 and then provided to the service controller 410 directly.

Figure 8:
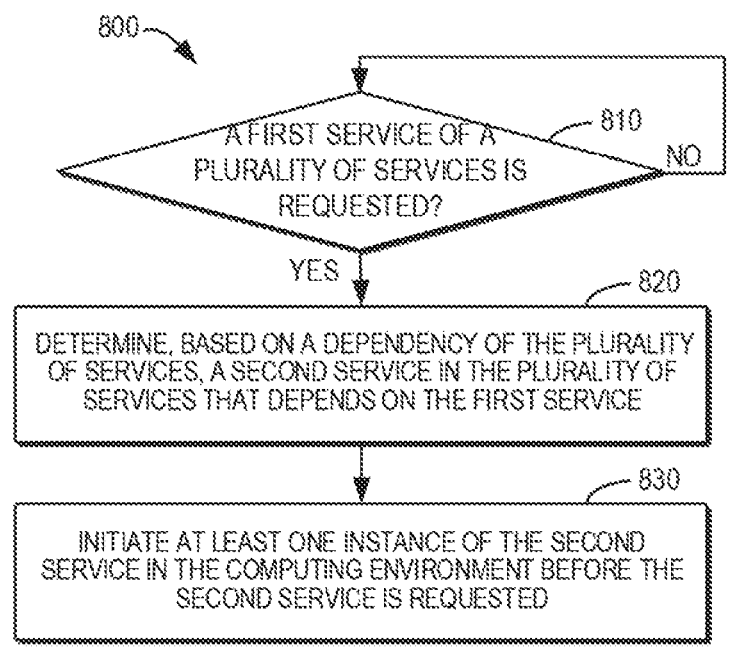
FIG. 8 depicts a flowchart of an example method according to an embodiment of the present invention.

FIG. 8 shows a flowchart of an example method 800 according to an embodiment of the present disclosure. The method 800 can be implemented at a service controller that is configured for service initiation, such as the service controller 410 as shown in FIG. 4. For the purpose of discussion, the method 800 will be described from the perspective of the service controller 410 with reference to FIG. 4.

The service controller 410 detects, at block 810, whether a first service of a plurality of services is requested in a computing environment. The plurality of services support execution of different types of tasks of a function. At block 820, in response to detecting that the first service is requested, the service controller 410 determines, based on a dependency relationship between the services, a second service in the plurality of services that depends on the first service. At block 830, the service controller 410 initiates at least one instance of the second service in the computing environment before the second service is requested. In the method 800, if no request for the first service is detected, the service controller 410 may continue the detection.

In some embodiments, the service controller 410 may further determine the dependency relationship between the plurality of services based on at least one of the following: respective configuration profiles of the plurality of services, historical operational information associated with historical instances of the plurality of services, and a user definition on at least a part of the dependency relationship.

In some embodiments, the historical operational information may comprise at least one of the following: historical network connections among the historical instances of the plurality of services, historical data flows through the historical instances of the plurality of services, and historical usage of computing resources by the historical instances of the plurality of services.

In some embodiments, at least one instance of the first service has been initiated in the computing environment.

In some embodiments, initiating the at least one instance of the second service may comprise determining a time point for initiating the at least one instance of the second service based on a time point when the first service is requested, an execution time duration of a task by the at least one instance of the first service, and an initiating time duration of the at least one instance of the second service, and initiating the at least one instance of the second service at the determined time point.

In some embodiments, determining the time point for initiating the at least one instance of the second service may comprise determining the time point for initiating the at least one instance of the second service such that the initiating of the at least one instance of the second service is completed before execution of the task is completed by the at least one instance of the first service.

In some embodiments, initiating the at least one instance of the second service may comprise determining a first number of the at least one instance of the second service based on a second number of the at least one instance of the first service and a predetermined instance ratio of the first service to the second service.

In some embodiments, the service controller 410 may further determine the instance ratio based on historical execution of tasks by historical instances of the first and second services.

In some embodiments, the service controller 410 may further detect whether one of the at least one instance of the second service is idle for task execution and in response to detecting that the instance of the second service is idle, terminating, by one or more processors, the instance of the second service.

In some embodiments, the service controller 410 may further detect whether the at least one instance of the first service is idle for task execution, and in response to detecting that the at least one instance of the first service is idle and in response to the first service being directly requested by a user, keeping, by one or more processors, the at least one instance of the first service running in the computing environment.

In some embodiments, determining the second service may comprise determining the second service that depends directly on the first service or depends indirectly on the first service via at least one further service of the plurality of services.

It should be noted that the processing of service initiation or the service controller according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    detecting, by one or more processors, whether a first service of a plurality of services is requested in a computing environment, the plurality of services supporting execution of different types of tasks of a function;
    in response to detecting that the first service is requested, determining, by one or more processors, and the plurality of services associated with the first service based on a dependency relationship between the plurality of services and the first service, and identifying a second service of the plurality of services that directly depends on the first service; and
    initiating, by one or more processors, at least one instance of the second service in the computing environment before the second service is requested based on detecting that the first service is requested; and
    initiating, by the one or more processors, and based on the dependency relationship between the plurality of services, a remaining service from the plurality of services before the remaining service is requested in response to detecting that a service on which the remaining service directly depends is requested in the computing environment; and
    wherein initiating the at least one instance of the second service further comprises:
    determining, by one or more processors, a time point for initiating the at least one instance of the second service based on a request time when the first service is requested, an execution time duration of a task by the at least one instance of the first service, and an initiating time duration of the at least one instance of the second service; and
    initiating, by one or more processors, the at least one instance of the second service at the determined time point; and
    wherein determining the time point for initiating the at least one instance of the second service further comprises:
    determining, by one or more processors, the time point for initiating the at least one instance of the second service such that the initiating of the at least one instance of the second service is completed before execution of the task is completed by the at least one instance of the first service.

2. The method of claim 1, further comprising:
    determining, by one or more processors, the dependency relationship between the plurality of services based on at least one of respective configuration profiles of the plurality of services, historical operational information associated with historical instances of the plurality of services, and a user definition on at least a part of the dependency relationship.

3. The method of claim 2, wherein the historical operational information is selected from a group comprising at least one of historical network connections among the historical instances of the plurality of services, historical data flows through the historical instances of the plurality of services, and historical usage of computing resources by the historical instances of the plurality of services.

4. The method of claim 1, wherein at least one instance of the first service is initiated in the computing environment.

5. The method of claim 4, wherein initiating the at least one instance of the second service further comprises:
    determining, by one or more processors, a first number of the at least one instance of the second service based on a second number of the at least one instance of the first service and a predetermined instance ratio of the first service to the second service.

6. The method of claim 5, further comprising:
    determining, by one or more processors, the instance ratio based on historical execution of tasks by historical instances of the first and second services.

7. The method of claim 1, further comprising:
    detecting, by one or more processors, whether the at least one instance of the second service is idle for task execution; and
    in response to detecting that the instance of the second service is idle, terminating, by one or more processors, the instance of the second service.

8. The method of claim 4, further comprising: detecting, by one or more processors, whether the at least one instance of the first service is idle for task execution; and
    in response to detecting that the at least one instance of the first service is idle and in response to the first service being directly requested by a user, keeping, by one or more processors, the at least one instance of the first service running in the computing environment.

9. The method of claim 1, wherein determining the second service comprises:
    determining, by one or more processors, the second service that depends directly on the first service or depends indirectly on the first service via at least one further service of the plurality of services.

10. A system comprising:
    a processing unit; and
    a memory coupled to the processing unit and storing instructions thereon, the instructions, when executed by the processing unit, performing a method including:
    detecting whether a first service of a plurality of services is requested in a computing environment, the plurality of services supporting execution of different types of tasks of a function;
    in response to detecting that the first service is requested, determining the plurality of services associated with the first service based on a dependency relationship between the plurality of services and the first service, and identifying a second service of the plurality of services that directly depends on the first service; and
    initiating at least one instance of the second service in the computing environment before the second service is requested based on detecting that the first service is requested; and
    initiating, based on the dependency relationship between the plurality of services, a remaining service from the plurality of services before the remaining service is requested in response to detecting that a service on which the remaining service directly depends is requested in the computing environment; wherein initiating the at least one instance of the second service further comprises:
determining a time point for initiating the at least one instance of the second service based on a request time when the first service is requested, an execution time duration of a task by the at least one instance of the first service, and an initiating time duration of the at least one instance of the second service; and
initiating the at least one instance of the second service at the determined time point; and
wherein determining the time point for initiating the at least one instance of the second service further comprises:
determining the time point for initiating the at least one instance of the second service such that the initiating of the at least one instance of the second service is completed before execution of the task is completed by the at least one instance of the first service.

11. The system of claim 10, wherein the acts further comprise:
determining the dependency relationship between the plurality of services based on at least one of respective configuration profiles of the plurality of services, historical operational information associated with historical instances of the plurality of services, and a user definition on at least a part of the dependency relationship.

12. The system of claim 11, wherein the historical operational information is selected from a group comprising at least one of historical network connections among the historical instances of the plurality of services, historical data flows through the historical instances of the plurality of services, and historical usage of computing resources by the historical instances of the plurality of services.

13. The system of claim 10, wherein at least one instance of the first service is initiated in the computing environment.

14. The system of claim 13, wherein initiating the at least one instance of the second service comprises:
determining a first number of the at least one instance of the second service based on a second number of the at least one instance of the first service and a predetermined instance ratio of the first service to the second service.

15. The system of claim 10, wherein the acts further comprise: detecting whether the at least one instance of the second service is idle for task execution; and in response to detecting that the instance of the second service is idle, terminating the instance of the second service.

16. A computer program product being tangibly stored on a non-transient machine-readable medium and comprising machine-executable instructions, the instructions, when executed on a device, causing the device to perform acts including:
detecting whether a first service of a plurality of services is requested in a computing environment, the plurality of services supporting execution of different types of tasks of a function;
in response to detecting that the first service is requested, determining the plurality of services associated with the first service based on a dependency relationship between the plurality of services and the first service, and identifying a second service of the plurality of services that directly depends on the first service; and
initiating at least one instance of the second service in the computing environment before the second service is requested based on detecting that the first service is requested; and
initiating, based on the dependency relationship between the plurality of services, a remaining service from the plurality of services before the remaining service is requested in response to detecting that a service on which the remaining service directly depends is requested in the computing environment; and
wherein initiating the at least one instance of the second service further comprises:
determining a time point for initiating the at least one instance of the second service based on a request time when the first service is requested, an execution time duration of a task by the at least one instance of the first service, and an initiating time duration of the at least one instance of the second service; and
initiating the at least one instance of the second service at the determined time point; and
wherein determining the time point for initiating the at least one instance of the second service further comprises:
determining the time point for initiating the at least one instance of the second service such that the initiating of the at least one instance of the second service is completed before execution of the task is completed by the at least one instance of the first service.

* * * * *